United States Patent
Shibutani

(10) Patent No.: US 7,411,623 B2
(45) Date of Patent: Aug. 12, 2008

(54) PHOTOGRAPHED IMAGE RECORDING AND REPRODUCING APPARATUS WITH SIMULTANEOUS PHOTOGRAPHING FUNCTION

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 797 days.

(21) Appl. No.: 10/804,916

(22) Filed: Mar. 19, 2004

(65) Prior Publication Data

US 2004/0189823 A1 Sep. 30, 2004

(30) Foreign Application Priority Data

Mar. 31, 2003 (JP) ............... 2003-093562

(51) Int. Cl.
- H04N 5/00 (2006.01)
- H04N 5/225 (2006.01)
- H04N 5/76 (2006.01)
- H04N 5/262 (2006.01)
- H04N 5/222 (2006.01)

(52) U.S. Cl. .................. 348/333.02; 348/220.1; 348/231.2; 348/231.3; 348/231.5; 348/239; 348/333.12; 386/120

(58) Field of Classification Search ............. 348/220.1, 348/231.99, 231.3, 231.5, 239, 333.01–333.02, 348/333.04, 333.11–12, 231.2–3; 386/120
See application file for complete search history.

(56) References Cited

U.S. PATENT DOCUMENTS

| 5,937,136 | A | 8/1999 | Sato |
| 6,871,010 | B1 * | 3/2005 | Taguchi et al. ............. 386/120 |
| 7,228,061 | B2 * | 6/2007 | Mori et al. ................. 386/95 |

(Continued)

FOREIGN PATENT DOCUMENTS

CN 1313709 9/2001

(Continued)

OTHER PUBLICATIONS

Computer generated English translation of Japanese Patent Publication 09-284692 Published Oct. 31, 1997.*

Primary Examiner—John M Villecco
Assistant Examiner—Daniel M Pasiewicz
(74) Attorney, Agent, or Firm—Hogan & Hartson LLP

(57) ABSTRACT

A still image is photographed by a still image photographing operation performed during a moving-image photographing operation and a moving image is photographed during the moving-image photographing operation. The still image is recorded together with link information indicating the moving image to be linked with and the moving image is recorded together with link information indicating the still image to be linked with. Further, a timing information is recorded for indicating a photographing time when the still-image photographing operation is performed during the moving-image photographing operation. In an operation for reproducing the moving image, when a still image is prepared to be linked with the moving image, a still image mark M1 is displayed during a period from five seconds before to five seconds after the photographing timing. Upon manipulation during such period, the still image is displayed. In an operation for reproducing the still image, when a moving image to be linked with the still image is available, a moving image mark M2 is displayed. Upon manipulation, the moving image is reproduced from a position of the moving image corresponding to the photographing time.

12 Claims, 6 Drawing Sheets

U.S. PATENT DOCUMENTS

| | | | |
|---|---|---|---|
| 7,257,317 B2 * | 8/2007 | Ohnishi | 386/120 |
| 2001/0005442 A1 | 6/2001 | Ueda et al. | |
| 2001/0014202 A1 | 8/2001 | Honda et al. | |
| 2002/0003946 A1 | 1/2002 | Sasagawa et al. | |
| 2002/0140826 A1 | 10/2002 | Sato et al. | |
| 2002/0197067 A1 * | 12/2002 | Ohnishi | 386/120 |
| 2005/0069297 A1 * | 3/2005 | Kobayashi et al. | 386/120 |

FOREIGN PATENT DOCUMENTS

| | | |
|---|---|---|
| JP | 09-284692 | 10/1997 |
| JP | 11-055617 | 2/1999 |
| JP | 2000-069407 | 3/2000 |
| JP | 2001-111934 | 4/2001 |
| JP | 2002-290908 | 10/2002 |
| JP | 2003-009044 | 1/2003 |
| JP | 2003-092724 | 3/2003 |

* cited by examiner

CALLING KEY ↓

CALLING KEY ↓

PHOTOGRAPHED IMAGE RECORDING AND REPRODUCING APPARATUS WITH SIMULTANEOUS PHOTOGRAPHING FUNCTION

BACKGROUND OF THE INVENTION

1. Field of the Invention

The present invention relates to a photographed image recording and reproducing apparatus which is capable of reproducing a recorded image, and a photographed image recording and reproducing method.

2. Description of the Related Art

A conventional digital camera is provided with a solid state image pick-up element such as CCD, and has a still-image photographing function of obtaining a still image signal of a subject using such image pick-up element, and of recording the obtained still image signal on a recording storage. Some digital camera has a moving-image photographing function in addition to the above mentioned normal still-image photographing function.

In such digital camera, a technique is employed for performing a still image photographing process during a moving-image photographing process, in which, in response to an instruction to photograph a still image given while the moving-image photographing operation is performed to photograph moving-image frames at a certain moving-image frame frequency, a moving-image frame is photographed at the time when such instruction is given, and the photographed moving-image frame is recorded on the recording storage as a still image. In other words, in such digital camera, the moving-image photographing process and the still-image photographing process are performed concurrently.

For performing the still image photographing process during the moving-image photographing process, another technique has been proposed in which, when the instruction is given to photograph a still image during the moving-image photographing process, the moving-image photographing operation for obtaining moving-image frames is suspended once, and a still image is photographed and recorded on the recording storage during such suspension, and then the moving-image photographing process is resumed to photograph and record the moving-image frames again. In other words, in an interrupt process or in the suspension, the still-image photographing process is performed to photograph a still image.

SUMMARY OF THE INVENTION

The present invention has been made in consideration of the circumstances set forth above.

According to one aspect of the invention, there is provided a photographed image recording and reproducing apparatus which comprises a memory for recording plural photographed image data, a reproducing unit for reproducing the photographed image data recorded on the memory, a judging unit for judging whether or not the photographed image data reproduced by the reproducing unit is one of plural photographed image data which are obtained in a simultaneous photographing operation for obtaining more than one image data simultaneously, and an advising unit for giving notice that the photographed image data obtained in the simultaneous photographing operation is reproduced, when the judging unit determines that one of the plural photographed image data obtained in the simultaneous photographing operation is reproduced by the reproducing unit.

According to another aspect of the invention, there is provided a photographed image recording and reproducing apparatus which comprises memory means for recording plural photographed image data, reproducing means for reproducing the photographed image data recorded on the memory means, judging means for judging whether or not the photographed image data reproduced by the reproducing means is one of plural photographed image data which are obtained in a simultaneous photographing operation for obtaining more than one image data simultaneously, and advising means for giving notice that the photographed image data obtained in the simultaneous photographing operation is reproduced, when the judging means determines that one of the plural photographed image data obtained in the simultaneous photographing operation is reproduced by the reproducing means.

According to still another aspect of the invention, there is provided a photographed image recording and reproducing method which comprises reproducing photographed image data recorded on a memory, judging whether or not the reproduced photographed image data is one of plural photographed image data which are obtained in a simultaneous photographing operation for obtaining more than one image data simultaneously, and giving notice that the photographed image data obtained in the simultaneous photographing operation is reproduced, when it is determined that one of the plural photographed image data obtained in the simultaneous photographing operation is reproduced.

According yet another aspect of the invention, there is provided a program for a computer used in a photographed image recording and reproducing apparatus, the program which comprises instructions that cause the computer to reproduce photographed image data recorded on a memory, to judge whether or not the reproduced photographed image data is one of plural photographed image data which are obtained in a simultaneous photographing operation for obtaining more than one image data simultaneously, and to give notice that the photographed image data obtained in the simultaneous photographing operation is reproduced, when the it is determined that one of the plural photographed image data obtained in the simultaneous photographing operation is reproduced.

DETAILED DESCRIPTION OF THE PREFERRED EMBODIMENTS

Figure 1:
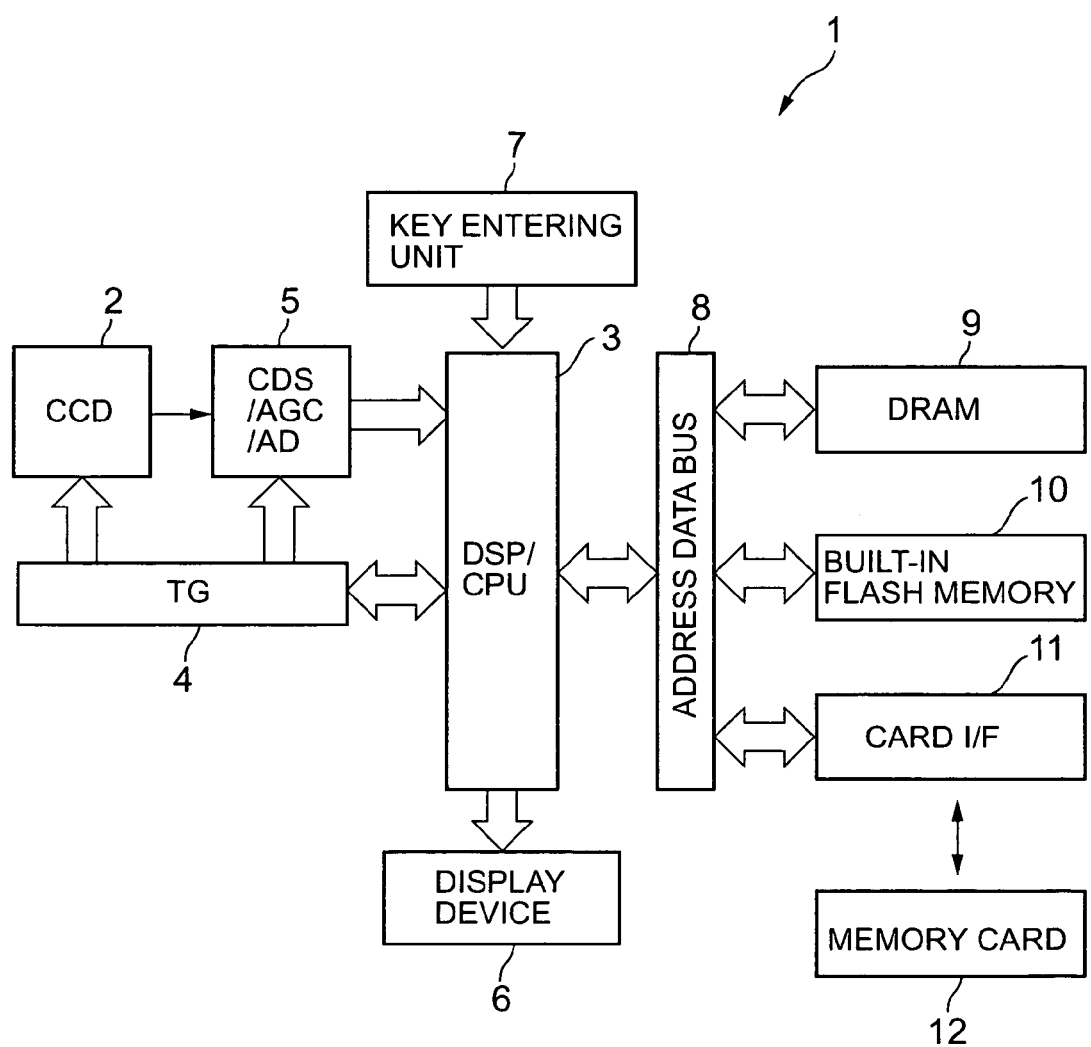
FIG. 1 is a block diagram illustrating a configuration of a digital camera according to a first embodiment of the present invention.

Now, an embodiment of the invention will be described with reference to the accompanying drawings. FIG. 1 is a block diagram illustrating a schematic configuration of a digital camera 1. The digital camera 1 is provided with a normal photographing function and a moving-image photographing function, and further is capable of photographing a still image while photographing a moving-image. The digital camera 1 has CCD 2 and DSP/CPU 3. The DSP/CPU 3 consists of one chip microcomputer which has various digital signal processing functions such as image-data compression and expansion processes, and which controls operations of various sections of the digital camera 1.

The DSP/CPU 3 is connected with a Timing Signal Generator (TG) 4 for driving the CCD 2, and the TG 4 is connected with a unit circuit 5, which includes a Correlated Double Sampling circuit (CDS circuit) for subjecting an image signal output from the CCD 2 to a correlated double sampling process and for holding the same, an automatic gain control amplifier (AGC) for amplifying the image signal, and an analog/digital converter (AD) for converting the amplified image signal into a digital signal. The output signal from the CCD 2 is converted into the digital signal and further transferred to DSP/CPU 3 through the unit circuit 5.

The DSP/CPU 3 is connected with a display device 6 and a key entering unit 7, and further connected through an address data bus 8 with DRAM 9, a built-in flash memory 10, and a card interface 11. The card interface 11 is electrically connected to a memory card 12 received in a slot (not shown) of the digital camera body 1. The memory card 12 serves a storage memory for storing pick-up still-image data and pick-up moving-image data, and further stores link information to be described later in the present embodiment and serves as a predetermined information storing means of the present invention.

The display device 6 includes a color LCD and its driving circuit, and displays, in a standby state for taking a picture, a through image of an optical image of a subject that is to be photographed with the CCD 2 and further displays, in a recorded-image reproducing mode, a recorded image (still image or moving image) which is read out from the memory card 12 and expanded in the DSP/CPU 3. Further in the recorded-image reproducing mode, the display device 6 displays a still-image mark M1 and a moving-image mark M2, serving according to need as alarm means or display means of the present invention.

The key entering unit 7 includes plural manipulation keys such as a shutter button, a recording start/stop button used for recording a moving image, a link-file key used for reproducing a recorded image, a power key, and a menu key. The key entering unit 7 outputs a key entering signal corresponding to the manipulation key manipulated by a user to the DSP/CPU 3. Other key such as the shutter button can be used as the link-file key.

The DRAM 9 serves as a buffer memory for temporarily storing the digitalized image data of the subject generated by the CCD 2, and further is used as a working memory for the DSP/CPU 3. For instance, when the shutter button is manipulated to photographing a still image, the image data temporarily stored in the DRAM 9 is subjected to the various digital signal processes performed by the DSP/CPU 3, including the signal compression and expansion processes, to be converted into an image file in a predetermined format such as JPEG format, and the image file is finally recorded on the memory card 12.

On the built-in flash memory 10 are stored control programs for the DSP/CPU 3 to control operations of the various sections, that is, control programs for controlling various operations such as an auto-focusing control (AF) and an auto-exposure control (AE), and data necessary for controlling various operations. The DSP/CPU 3 works in accordance with the programs to serve as the discriminating means and control means of the present invention.

Figure 2:
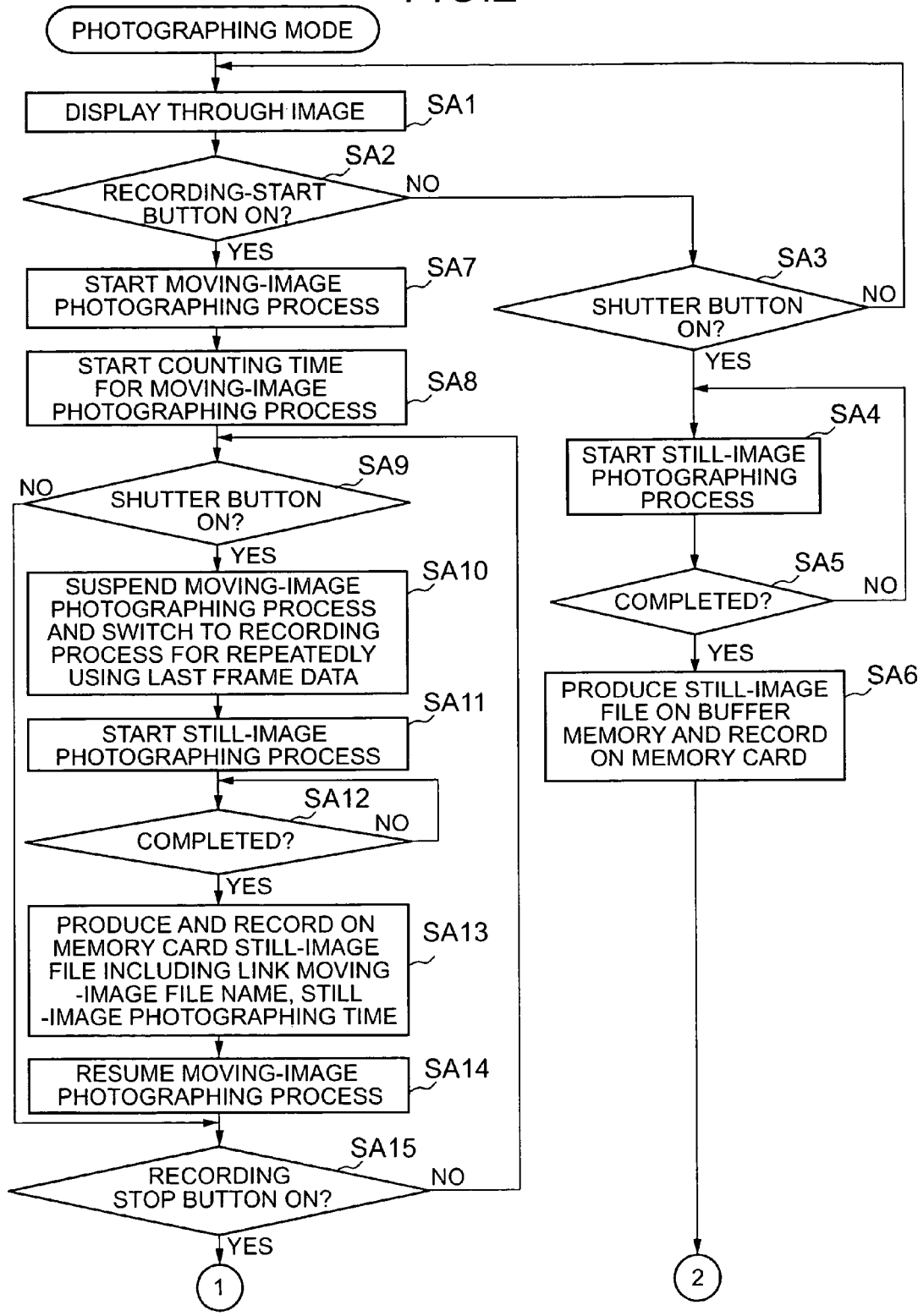
FIGS. 2 and 3 are flow charts showing operation of the still camera in a photographing mode.
Figure 3:
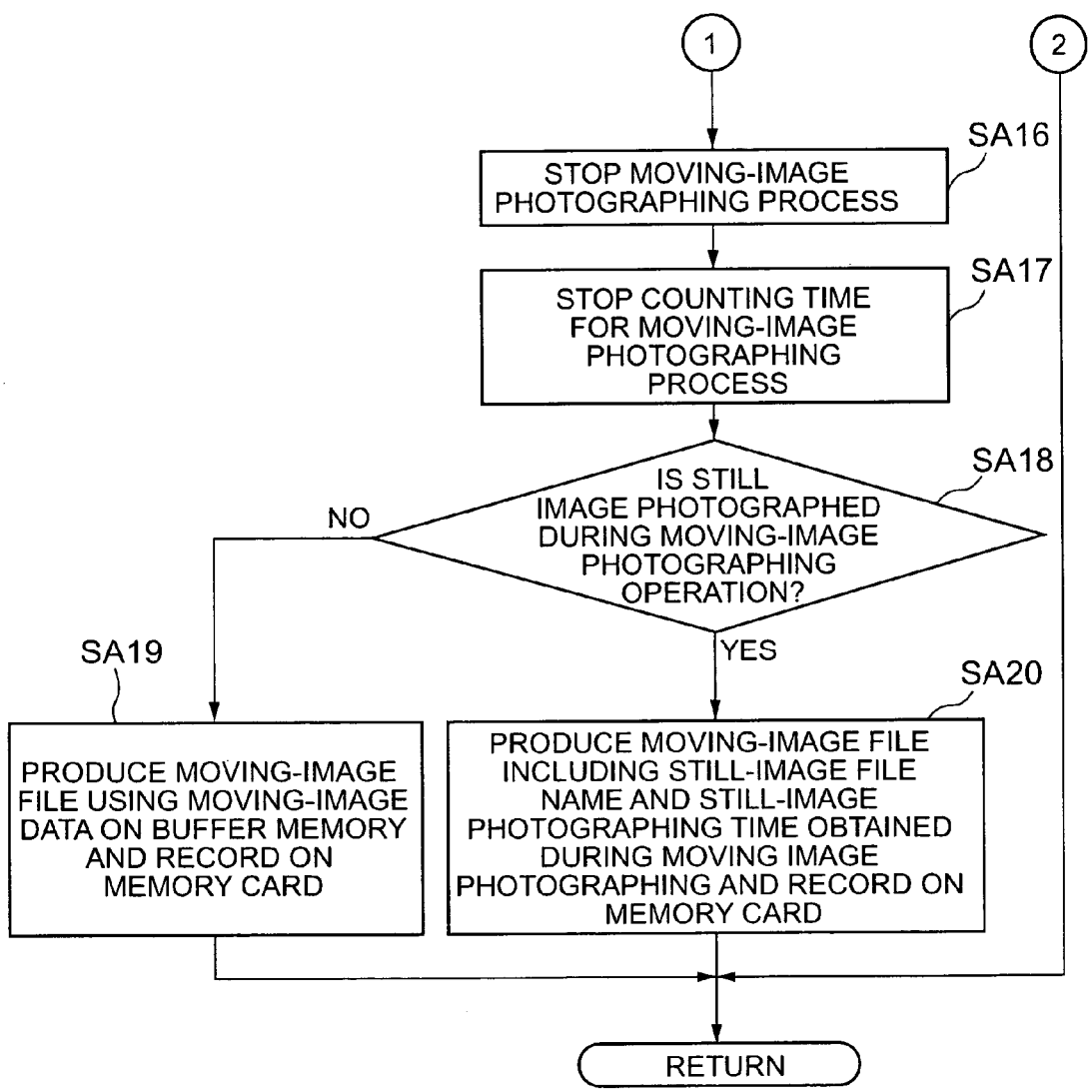

Now, operation of the digital still camera 1 having the configuration set forth above will be described. FIG. 2 and FIG. 3 are flow charts showing processes performed by the DSP/CPU 3 in a photographing mode, which is set by manipulating the MENU key.

When the photographing mode has been set, the DSP/CPU 3 causes the CCD 2 to start a photographing operation to display a through image of the subject on the display device 6 at step SA1. A process for displaying the through image is repeatedly performed until a recording-start button or the shutter button is manipulated (at Steps SA2 and SA3: NO).

Meanwhile, upon depression of the shutter button (at step SA2: NO, and at step SA3: YES), the photographing mode is switched to the normal still-image photographing mode. In the normal still-image photographing mode, the still-image photographing process starts, including a process for setting a photographing condition in AF AND AE operations, and a process for photographing and recording the subject by CCD 2 at step SA4. When the still-image photographing process has been completed (at step SA5: YES), the DSP/CUP 3 produces a still-image file on the buffer memory (DRAM 9) and records the same on the memory card 12 at step SA6, and then returns to the process at SA1 to display the through image.

When the record-start button is depressed while the through image is on the display device (at step SA2: YES), the photographing mode is switched to a moving-image photographing mode. In the moving-image photographing mode, a moving-image photographing process starts at step SA7 to photograph and record a moving image (moving frame) at a predetermined frame rate (at a fixed cycle of ⅓₀ seconds) and at the same time a time counting operation starts at step SA8 to count a time period during which a moving image is photographed based on a clock signal generated by a built-in clock. When photographing the moving frame in the moving-image photographing process, the DSP/CPU 3 causes the CCD 2 to output only pixel data of odd lines in an image frame at a comparatively short interval, and holds the pixel data of odd lines on the buffer memory (DRAM 9), and further subjects the held pixel data to a thinning process to generate data of a predetermined number of pixels. Thereafter, the moving-image recording process is performed until either of the shutter button and the recording stop button is depressed (at steps SA9 and SA15: NO).

When the shutter button is depressed during the moving-image recording process (at step SA9: YES), the photographing mode is switched to the still-image photographing mode in which an interrupt process is performed, and thereafter processes at step SA10 through step SA14 are performed. At the time when the shutter button is depressed, the normal moving-image recording process is suspended and switched to the moving-image recording process at step SA10, in which the last image frame is repeatedly used. In other words, in such moving-image recording process, substitution frame data is produced by reproducing the frame data stored right before the shutter button is depressed, and until the still-image photographing process or the interrupt process is completed, the substitution frame data is used in place of frame data produced by the photographing process as frame data that is to be stored on the buffer memory at a predetermined frame rate.

Figure 4A:
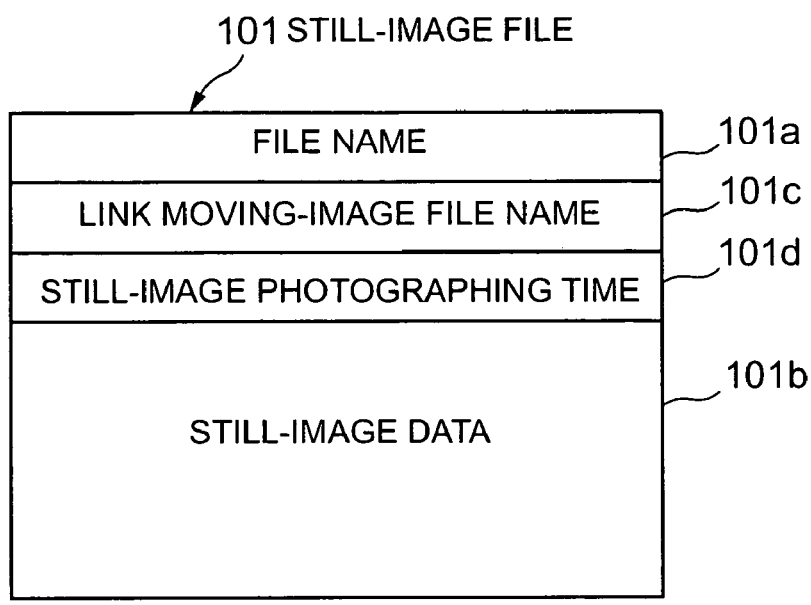
FIGS. 4A and 4B are views illustrating data structures in a still-image file and a moving-image file recorded in the photographing mode, respectively.

Then, the still-image photographing process similar to that at step SA4 starts at step SA11, and when the process is completed (at step SA12: YES), a still-image file 101 including data shown in FIG. 4A is produced on the buffer memory, and is recorded on the memory card 12 at step SA13. The still-image file 101 recorded on the memory card 12 contains link information which indicates a moving image that is being recorded at that time, that is, a link moving-image file name 101*c* which is the same name as assigned to a moving-image file, and a still-image photographing time 101*d* which indicates a time duration counted from the beginning of the moving-image photographing process, in addition to a file name 101*a* and a compressed still-image data 101*b*. It should be noted that the still-image file produced on the buffer memory at step SA6 does not contain the link information. At step SA14, the moving-image photographing process is switched back to the normal moving-image photographing process again, and the moving-image photographing process is continued.

When the record-stop button is depressed (at step S15: YES), the moving-image photographing process and the time counting process for counting the moving-image photographing time are terminated at steps SA16 and SA17. And when the moving-image photographing operation is not interrupted by the interrupt process set forth above to perform the still-image photographing process (at step SA18: NO), a moving-image file (in motion-jpeg format or other) is created by using moving-image data that has been expanded over the buffer memory, that is, by using moving-image data including plural frames of image data that have been obtained periodically, and the created moving-image file is recorded on the memory card 12 at step SA19. In other words, a moving image file similar to that obtained in the normal moving-image photographing mode is recorded.

Figure 4B:
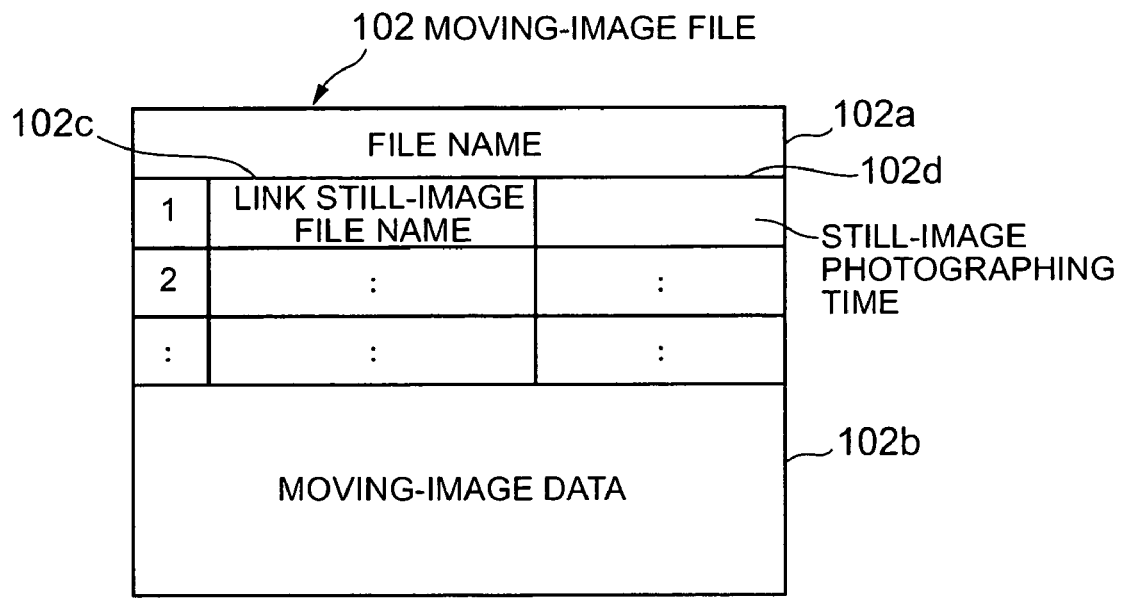

Meanwhile, when the interrupt process for photographing a still image occurs during the moving-image photographing operation (at step SA18: YES), a moving-image file 102 shown in FIG. 4B is created and recorded on the memory card 12 at step SA20. The moving-image file 102 contains a file name 102*a* and a compressed moving-image data 102*b*, and further contains link information indicating the still-image file 101 obtained and recorded in the interrupt process, that is, the link information including a link still-image file name 102*c* which is the same file name as displayed in FIG. 4A, and a still-image photographing time 102*d*. The same pieces of link information as the still-image files 101 are contained in the moving image file 102. It should be noted that the moving-image file created and recorded at step SA19 does not contain the link information. Now, the DSP/CPU 3 quits the moving-image photographing process and returns to the process at step SA1.

Figure 5:
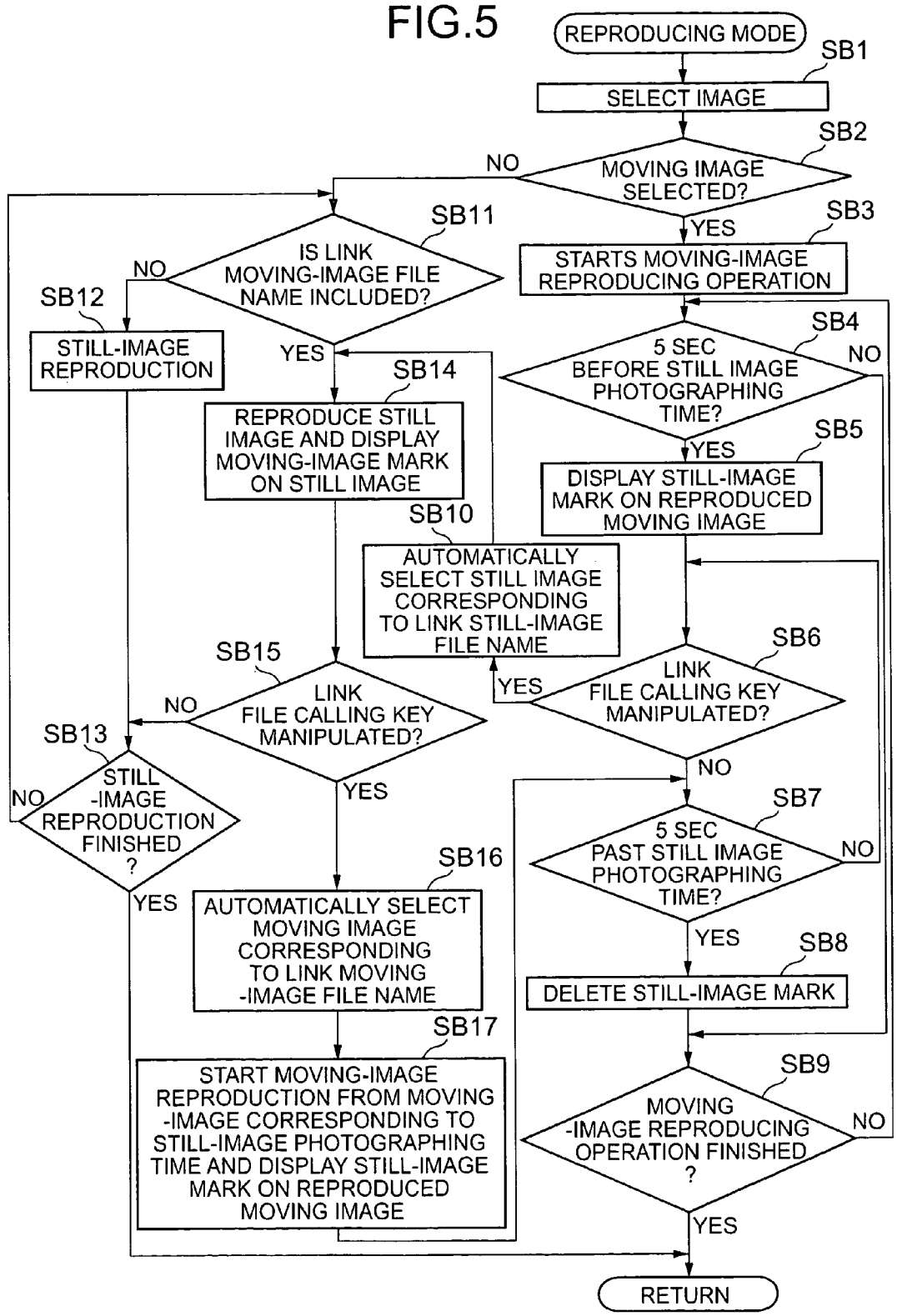
FIG. 5 is a flow chart showing operation of the still camera in a reproducing mode.

FIG. 5 is a flow chart showing the operation of the DSP/CPU 3 in a reproducing mode set by manipulating the MENU key.

When the reproducing mode is set, the DSP/CPU 3 allows the user to select an image which he or she wants to display from among the still images and moving images recorded on the memory card 12 at step SB1. More specifically, for example, the DSP/CPU 3 lists recorded images on the display device, allowing the user to select his or her desired image among the listed images by manipulating the key, or displays the recorded images sequentially in response to key manipulation by the user, allowing his or her to select one. When the user selects a slide show function for automatically displaying all the recorded images continuously in a slide show, the DSP/CPU 3 automatically selects, in response to a display-start manipulation, the images in an order in which the images are displayed.

Figure 6A:
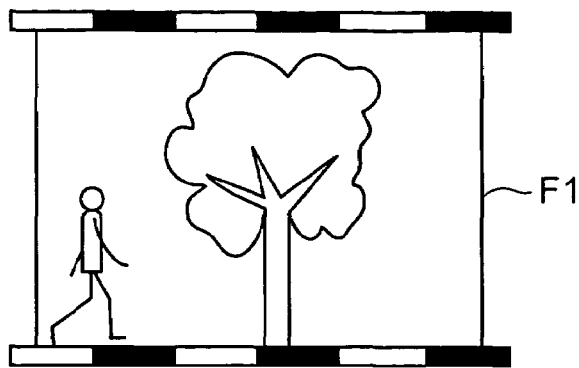
FIGS. 6A, 6B, 6C and 6D are views showing samples of a reproduced still image and moving image.

When the user select the moving image (at step SB2: YES), the DSP/CPU 3 reads out the selected moving-image file from the memory card 12, and starts the moving image reproducing operation, expanding the recorded moving-image data, or the plural frames of images over the DRAM 9, and displaying the expanded frames of images sequentially at the predetermined frame rate on the display device 6 at step SB3. At this time, on the display device is displayed a frame of image F1 shown in FIG. 6A.

In the moving-image reproducing operation, the DSP/CPU 3 judges whether or not a reproducing time for the moving image has reached a time which corresponds to five seconds before the still image photographing time 102*d* embedded as the link information in the moving-image file 102. The DSP/CPU 3 keeps performing the moving-image reproducing operation until the reproducing time reaches the time corresponding to five seconds before the still image photographing time 102*d* (at step SB4: NO). In case no link information is embedded in the moving-image file which is being reproduced, the result of the judgment at step SB4 is NO at all times, and the moving-image reproducing operation continues. At the time when the moving image has been completely reproduced (at step SB9: YES), (or upon manipulation by the user), the image reproducing operation automatically terminates and the process returns to step SB1, where the user is prompted to select another image.

Figure 6B:
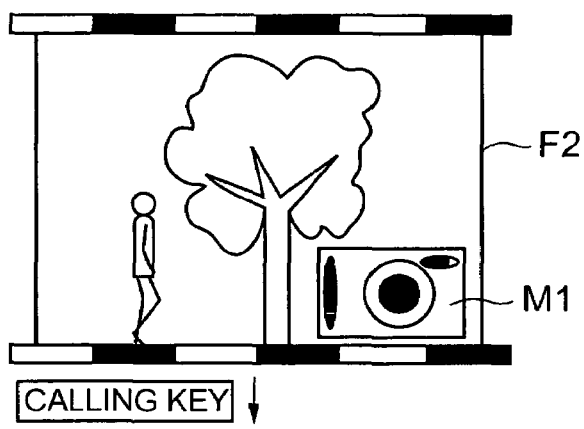

Meanwhile, in the reproducing operation of the moving image with the link information embedded, when the reproducing time has reached the time corresponding to five seconds before the still image photographing time 102*d* (at step SB4: YES), the still image mark M1 is displayed on the frame of image F2 that is on the display device 6 at that time in a super imposed manner, as shown in FIG. 6B (at step SB5). Thereafter, unless the user manipulates a link-file calling key (at step SB6: NO), the still image mark M1 is kept displayed for ten seconds, that is, the still image mark M1 is kept displayed until the reproducing time reaches a time corresponding to five seconds after the still image photographing time 102*d* (at step SB7: NO), and the still image mark M1 is caused to disappear at the time (at step SB8) when the reproducing time has reached such time corresponding to five seconds after the still image photographing time 102*d*.

At the time when the user manipulates the link-file calling key (at step SB6: YES) while the still image mark M1 is on the display device 6, the moving-image reproducing operation is suspended, the still image file is automatically selected and read out from the memory card 12 (at step SB10), which file corresponds to the link still-image file name 102*c* that is associated with the still-image photographing time 102*d* and embedded in the moving image file 102. In other words, the still image file is automatically read out from the memory 12, which file is photographed or produced in the interrupt process occurred in a period between five seconds before and five seconds after a time when the moving image (F2) is displayed during the moving-image photographing operation for photographing the moving image which is being reproduced. Then, processes at step SB14 and at steps following to step SB14 are performed.

Figure 6C:
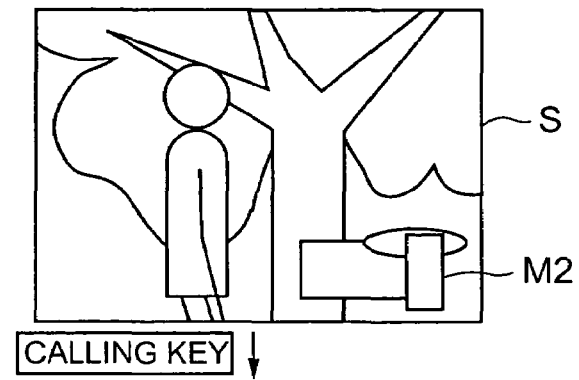

At step SB14, the still image is displayed on the display device 6 based on the read out still image file and the moving image mark M2 is displayed on the reproduced still image S in a super imposed manner as shown in FIG. 6C (at step SB14). The still image S and the moving image mark M2 are displayed (at both steps SB15 and SB13: NO and at step SB11: YES) until the user manipulates the link-file calling key or manipulates to terminate the still-image reproducing operation, and upon manipulation by the user to terminate the still-image reproducing operation, the image reproducing operation is suspended, and the operation returns to the process at step SB1, prompting the user to select another image.

Figure 6D:
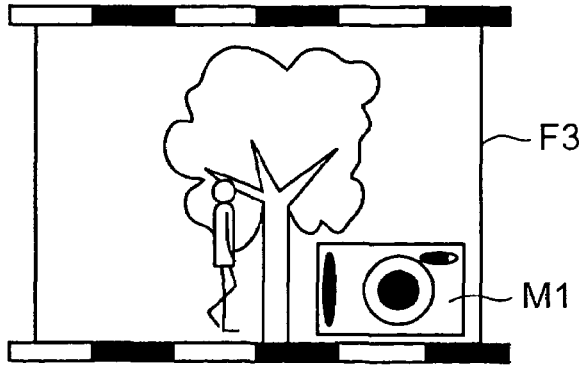

When the user manipulates the link-file calling key (at step SB15: YES) while the still image S and the moving image mark M2 are displayed, the moving image file is automatically selected and read out from the memory card 12 at step SB16, which file corresponds to the link moving-image file name 101c embedded as the link information in the file of the still image S which is on the display device 6, or which file was displayed on the display device 6 just before the still image S is displayed. Then, the still-image photographing time 101d embedded together with the link moving-image file name 101c is confirmed, and the moving-image reproducing operation starts with the frame of image F3 shown in FIG. 6D, which corresponds to the reproducing time indicated by the still-image photographing time 101d contained in the read out moving image file 102. That is, the moving image reproducing operation starts to reproduce the frames of image which are photographed after the still image S was photographed, and in this case, the moving image reproducing operation starts to reproduce the frames of image which are photographed after the moving-image photographing operation was suspended for displaying the still image S, and at the same time the still image mark M1 is displayed on the frame of image F3 in an over lapping manner again at step SB17, as shown in FIG. 6D.

Then, the operation returns to the process at SB7, and the still image mark M1 is removed from the frame of image F3 five seconds after the still-image photographing time (at step SB7: YES and at step SB8). Thereafter, if the moving-image file which is being reproduced contains another link information, the still image mark M1 is displayed for a predetermined time in the processes at steps SB4 through SB7, and upon manipulation by the user of the link information file calling key, the moving-image reproducing operation is suspended and a still image indicated by the link information is displayed. If the moving-image file contains no other link information, the moving image operation is automatically suspended at the time when the rest of the frames of image have been reproduced (at step SB9: YES) (or upon the user's manipulation to suspend the operation), and the operation returns to the process at step SB1, prompting the user to select another image.

Apart from the above process, if the image that is selected by the user at step SB1 is a still image (at step SB2: NO), it is judged at first at step SB11 whether or not the above mentioned link moving-image file name 101c (FIG. 4A) is embedded in the file of the still image selected by the user. When no link information is embedded, the normal still-image reproducing operation is performed at step SB12 and upon the user's manipulation to interrupt the still-image reproducing operation (or when a predetermined time has lapsed), the reproducing operation is manually or automatically suspended, and the operation returns to the process at step SB1, prompting the user to select another image.

When the link moving-image file name 101c is embedded in the file of the still image that is selected by the user (at step SB11: YES), the still image is reproduced and the moving-image mark M2 is displayed on the still image in an over lapping manner at step SB14, performing the processes at step SB15 and at the following steps. More specifically, when the user manipulates the link-file calling key while the still image reproduction is performed, the moving image designated by the link moving image file name 101c is reproduced from the reproducing position of the moving image corresponding to the time designated by the still image photographing time 101d (FIG. 4A) Thereafter, the processes set forth above are performed.

As described above, the digital camera 1 according to the present embodiment informs the user by displaying the still image mark M1 during the moving image reproducing operation of the photographed still image available and the time when such still image was photographed, if a still image was photographed during the moving-image photographing operation. Therefore, the user of the digital camera 1 can easily know whether or not a still image is available that was photographed during the moving-image photographing operation (a still image photographed concurrently with the moving image).

Further, when the user manipulates the link-file calling key while the still image mark M1 is displayed on the display device 6, the still image photographed concurrently with the moving image is reproduced at once. As described, the digital camera 1 provides a user-friendly feature that reproduces the still image only when needed. Especially, when a lot of still images photographed simultaneously with the moving image are prepared, the digital camera 1 of the present embodiment may be used more conveniently.

Furthermore, the present digital camera 1 informs the user by displaying the moving image mark M2 during the still image reproducing operation of the photographed moving image available, if a moving image was photographed during the still-image photographing operation. Therefore, the user of the digital camera 1 can easily know whether or not a moving image is available that was photographed during the still-image photographing operation (a moving image photographed simultaneously with the still image). Therefore, the digital camera 1 may be used more conveniently by the user to know if the moving image photographed simultaneously with the still image is available for each of the still images.

When the user manipulates the link-file calling key while the moving image mark M2 is displayed on the display device 6, the moving image photographed simultaneously with the still image is reproduced at once. As described above, the present digital camera 1 provides a user-friendly feature that reproduces the moving image only when needed. Especially, the digital camera 1 automatically reproduces the moving image photographed simultaneously with the still image from a reproducing position of the moving image corresponding to the time when the still image is photographed, and therefore, can be used more conveniently by the user to know under what circumstance the still image was photographed.

The embodiment has been described, in which, when an instruction is given to perform the still-image photographing operation during the moving-image photographing operation, the moving-image photographing operation is suspended at once to perform the interrupt process, allowing the still-image photographing operation to photograph a still image simultaneously with the moving image. But an arrangement may be employed to perform both the moving-image photographing operation and the still-image photographing operation without suspending the moving-image photographing operation. As an example of such arrangement, there is proposed a camera in which, when an instruction is given to perform the still-image photographing operation during the moving-image photographing operation, a frame of image that is photographed just at the time such instruction is given is extracted from the moving image and recorded as a still image, allowing operation to photograph a still image and a moving image concurrently. Another camera may be proposed that is provided with an image pick-up element for photographing a still image and a separate image pick-up element for photographing a moving image, allowing operation to photograph a still image and a moving image simultaneously.

In the instant embodiment, in the still image file 101 and the moving image file 102 (collectively, an image file) are embedded link file names (link moving-image file name 101c, and link still-image file name 102c), respectively, but amendment to the instant embodiment may be made to embed flag information in place of the link file names, which information simply represents that the link file (still image file 101 or moving image file 102) is available. In this amendment, when the flag information is embedded in the image file to be reproduced, a moving image mark or a still image mark is displayed on the reproduced image, but both the image files can not be read out automatically.

In the present embodiment, the link file name (of flag information) is embedded in both the still image file 101 and the moving image file 102, but the embodiment may be modified such that the link file name is embedded in either of the still image file 101 and the moving image file 102.

Further, in the present embodiment, link information (link moving-image file name 101c, link still-image file name 102c) and the still-image photographing times 101d, 102d are embedded in the image file, but the embodiment may be modified such that a separate management file other than the image file is prepared for recording the link information, a still image photographing time, and presence of the link file, or the still image file and the moving image file are given the same file name so as to be linked to each other by using such same file name. Further, the embodiment may be modified to record a date on which a still image is photographed, a time when operation to photograph a moving image starts, and a time when the operation to photograph a moving image finishes, and to judge based on the recorded data whether or not the date and time when the still image is photographed falls between the date and time when the moving-image photographing operation starts and the date and time when the moving-image photographing operation finishes to determine a relationship in linkage between the moving image and the still image. In the present modified embodiment, a special process is not required during the above mentioned recording and photographing operation.

In the embodiment, the still image mark M1 is displayed in the moving-image reproducing operation only for the period defined by times corresponding to five seconds before and five seconds after the time when the still image was photographed, but the embodiment may be modified to display the still image mark M1 at all times in the moving-image recording operation to call the linked still-image files at all times. In the modified embodiment, the still-image photographing time is not required to be embedded in the moving image file. But in this modified embodiment, the DSP/CPU 3 has to be given a reproducing function, and when plural still image files are linked with one moving image file, some device will be necessary to display over the reproduced moving image plural thumbnail images of the linked still images as still image icons for selection by the user, or to read out the plural linked still image files sequentially to display same in a multiple display screen or in a screen slide show (or in an automatic scrolling manner). Further in the modified embodiment, the still-image file names, and data representing the number of images may be displayed in addition to the still image icons and the still images, or in short any information may be used that designates plural still imaged to be linked.

In the present embodiment, when the link-file calling key is manipulated while the moving image mark M2 is displayed in the still-image reproducing operation, the moving image is reproduced from the position of the moving image corresponding to the time when the still-image is photographed, but the moving image may be reproduced from the very beginning. In this case, there in no need to embed such still-image photographing time in the image file.

Further, in the present embodiment, in the image file are embedded the link moving-image file names 101c, 102c, and the still-image photographing times 101d, 102d which indicate a time duration lapsed since the start of the moving image photographing operation, but the embodiment may be modified to record a time at which the moving image photographing operation starts, a time at which the still image photographing operation starts, and the number of frames of image generated while the moving-image photographing operation is performed in the still-image photographing operation and to judge in the image reproducing operation on the basis of the recorded data, the timing of the still-image photographing operation performed in the moving-image photographing operation.

Furthermore, in the present embodiment, the still image mark M1 and the moving image mark M2 are displayed over the reproduced moving image or still image to inform that a linked image is available, but the embodiment may be modified to display the thumbnail image of the linked image over the reproduced image in place of the still image mark M1 and the moving image mark M2 to inform that such linked image is available, or to display information for designating link images such as the link file name, and the number of image in place of the still image mark M1 and the moving image mark M2 to inform that a linked image is available, or to display a message, highlight an image, or use an informing devices such as a LED light to inform that a linked image is available.

In the present embodiment, the user is informed in the image reproducing operation that the link image is available, and the image file to be linked is read out upon manipulation by the user, but the embodiment may be modified to read out the link image automatically to display a thumbnail image thereof, when the image which has a link image is reproduced.

Further, in the present embodiment, only one of the still image and the moving image is displayed in the reproducing mode, but the embodiment may be modified to display the still images and the moving images on a multiple display screen, and further to display the still image marks M1 and the moving image marks M2 respectively over the corresponding images on the multiple display screen for easy review and calling the link image.

The embodiment has been described, in which the invention is applied to the moving image and the still image produced by photographing a still-image during the moving-image photographing operation, but the embodiment may be modified to have two image pick-up elements such as CCD which generates two still images or two moving images, wherein the invention is applied to these still images or moving images. In the modified embodiment, photographing operations are performed simultaneously using these two image pick-up elements with different resolution, field angles, and photographing areas, respectively, and obtained plural images are associated with each other and recorded.

In the above modified embodiment, two image pick-up elements are provided but more than two image pick-up elements may be used and the present invention may be applied to more than two images including still images and moving images that are simultaneously produced respectively by these more than three elements.

Further, in the present embodiment described above, the moving image data and the still image data obtained respectively in the moving-image photographing operation and in the still-image photographing operation are recorded in the one and same memory card, but the moving image data and the still image data may be stored in separate storage media respectively. For example, the embodiment of the invention may be modified such that, when the instruction is given to photograph a still image while moving image data produced by the moving image photographing operation is recorded on a magnetic recording tape, the obtained still image data is recorded on the memory card.

In the embodiments set forth above, the present invention is applied to the digital camera with the moving-image photographing function, but the invention may be applied to apparatus with a photographing function for photographing a still image and a moving image simultaneously, such as a movie camera with a still-image photographing function, a cellular phone with a camera function, a personal digital assistant (PDA) with a camera function, and a personal computer provided with a camera.

What is claimed is:

1. An electronic camera comprising:
   a memory for storing various sorts of data;
   a simultaneous photographing unit for recording in the memory moving image data, still image data and timing information in association with each other, when a still-image photographing operation is performed at a given timing during a moving-image photographing operation, wherein the moving image data is obtained in the moving-image photographing operation, the still image data is obtained in the still-image photographing operation, and the timing information is indicative of the timing at which the still-image photographing operation is to be performed;
   a moving-image reproducing unit for reproducing moving image data recorded in the memory by the simultaneous photographing unit;
   a stand-by operation starting unit for displaying a notice that still image data associated with the moving image data has been found, when a reproducing position in moving image data has reached a position corresponding to the timing indicated by the timing information while the moving image data is being reproduced by the moving-image reproducing unit, and at the same time starting a stand-by operation for waiting for instructing operation by a user;
   a stand-by operation performing unit for performing the stand-by operation started by the stand-by operation starting unit continuously in parallel with reproduction of moving image data by the moving-image reproducing unit;
   a still-image reproduction control unit for reproducing the still image data associated with the moving image data, when the user has performed instructing operation while the stand-by operation is being performed by the stand-by-operation performing unit;
   a stand-by operation ceasing unit for controlling the still-image reproduction control unit not to reproduce the still image data associated with the moving image data, and the stand-by operation starting unit to cease displaying the notice that still image data associated with the moving image data has been found, and the stand-by operation performing unit to cease performing the stand-by operation, when the user does not perform instructing operation before a first predetermined period lapses after the stand-by operation starting unit has started the stand-by operation; and
   a moving-image reproduction control unit for reproducing moving image data associated with the still image data recorded in the memory by the simultaneous photographing unit, when reproduction of moving image data is instructed while the still image data recorded in the memory by the simultaneous photographing unit is being reproduced, wherein when reproduction of the moving image data is restarted after reproduction of moving image data was interrupted by the still-image reproduction control unit to perform reproduction of still image data, the moving-image reproduction control unit starts reproduction of the moving image data from a reproducing position corresponding to the timing indicated by the timing information regardless of whether a position at which the still-image reproduction control unit interrupts reproduction of the moving image data corresponds to any position corresponding to a time falling within the first predetermined period.

2. The electronic camera according to claim 1, wherein the stand-by operation starting unit starts the stand-by operation, when a reproducing position in moving image data has reached a position corresponding to a time from which a second predetermined time lapses to reach a position corresponding to the timing indicated by the timing information while the moving image data is being reproduced by the moving-image reproducing unit.

3. The electronic camera according to claim 1 or 2, wherein the stand-by operation ceasing unit ceases the stand-by operation, when a reproducing position in moving image data has reached a position corresponding to a time from which a third predetermined time lapses after reaching a position corresponding to the timing indicated by the timing information while the moving image data is being reproduced by the moving-image reproducing unit.

4. The electronic camera according to claim 1, wherein the first predetermined period is a period of several seconds.

5. The electronic camera according to claim 1, wherein the moving-image reproduction control unit starts reproduction of the moving image data from a reproducing position corresponding to the timing indicated by the timing information, when the moving image data associated with the still image data is reproduced.

6. The electronic camera according to claim 1, wherein the moving-image reproduction control unit comprises a moving-image advising unit for giving notice that moving image data associated with the still image data is available, while the still image data is being reproduced, wherein the moving-image reproduction control unit reproduces moving image data associated with the still image data, when the user gives an instruction for reproduction of moving image data upon confirmation of the notice of the moving-image advising unit.

7. The electronic camera according to claim 6, wherein the stand-by operation starting unit displays a still image mark to give notice that still image data is available, and the moving-image advising unit displays a moving image mark different from the still image mark to give notice that moving image data is available.

8. The electronic camera according to claim 6, wherein the stand-by operation starting unit and the moving-image advising unit display other image data associated with image data which is being reproduced, together with said image data which is being reproduced, thereby giving said notice.

9. The electronic camera according to claim 6, further comprising:
   a simultaneous reproducing unit for reproducing plural sorts of image data including moving image data and still image data, simultaneously, wherein
   the stand-by operation starting unit and the moving-image advising unit display a notice indicating whether simultaneously photographed images corresponding respectively to images which are being reproduced simultaneously by the simultaneous reproducing unit are available or not.

10. The electronic camera according to claim 6, wherein, when a plurality of images are photographed and recorded simultaneously with image data which is being reproduced, the stand-by operation starting unit and the moving-image advising unit give notice to that effect.

11. The electronic camera according to claim 1, wherein, when still-image photographing operation has being performed during moving-image photographing operation, the simultaneous photographing unit associates moving image data with still image data using either one of file names and information indicating times when photographing operations are performed, and records the data associated with each other in the memory, wherein the moving image data is obtained in the moving-image photographing operation, and the still image data is obtained in the still-image photographing operation, and the file names are used for recording the moving image data and still image data.

12. A computer readable medium having a computer program recorded thereon, the computer program comprising a set of instructions when executed by a computer to operate as an electronic camera for photographing, recording and reproducing moving and still image data, the electronic camera comprising:
- a simultaneous photographing unit for recording in a memory moving image data, still image data and timing information in association with each other, when a still-image photographing operation is performed at a given timing during a moving-image photographing operation, wherein the moving image data is obtained in the moving-image photographing operation, the still image data is obtained in the still-image photographing operation, and the timing information is indicative of the timing at which the still-image photographing operation is to be performed;
- a moving-image reproducing unit for reproducing moving image data recorded in the memory by the simultaneous photographing unit;
- a stand-by operation starting unit for displaying a notice that still image data associated with the moving image data has been found, when a reproducing position in moving image data has reached a position corresponding to the timing indicated by the timing information while the moving image data is being reproduced by the moving-image reproducing unit, and at the same time starting a stand-by operation for waiting for instructing operation by a user;
- a stand-by operation performing unit for performing the stand-by operation started by the stand-by operation starting unit continuously in parallel with reproduction of moving image data by the moving-image reproducing unit;
- a still-image reproduction control unit for reproducing the still image data associated with the moving image data, when the user has performed instructing operation while the stand-by operation is being performed by the stand-by operation performing unit;
- a stand-by operation ceasing unit for controlling the still-image reproduction control unit not to reproduce the still image data associated with the moving image data, and the stand-by operation starting unit to cease displaying the notice that still image data associated with the moving image data has been found, and the stand-by operation performing unit to cease performing the stand-by operation, when the user does not perform instructing operation before a first predetermined period lapses after the stand-by operation starting unit has started the stand-by operation; and
- a moving-image reproduction control unit for reproducing moving image data associated with the still image data recorded in the memory by the simultaneous photographing unit, when reproduction of moving image data is instructed while the still image data recorded in the memory by the simultaneous photographing unit is being reproduced, wherein when reproduction of the moving image data is restarted after production of moving image data was interrupted by the still-image reproduction control unit to perform reproduction of still image data, the moving-image reproduction control unit starts reproduction of the moving image data from a reproducing position corresponding to the timing indicated by the timing information regardless of whether a position at which the still-image reproduction control unit interrupts reproduction of the moving image data corresponds to any position corresponding to a time falling within the first predetermined period.

* * * * *